United States Patent [19]

Zimmer

[11] Patent Number: 4,548,097
[45] Date of Patent: Oct. 22, 1985

[54] MANIPULATOR DRIVE

[75] Inventor: Ernst Zimmer, Friedberg, Fed. Rep. of Germany

[73] Assignee: Kuka Schweissanlagen & Roboter GmbH, Augsburg, Fed. Rep. of Germany

[21] Appl. No.: 326,762

[22] Filed: Dec. 2, 1981

[30] Foreign Application Priority Data

Dec. 19, 1980 [DE] Fed. Rep. of Germany ....... 3048067

[51] Int. Cl.[4] ............................................. F16H 37/06
[52] U.S. Cl. .................................. 74/665 M; 414/4; 414/7; 414/735; 414/739; 901/26
[58] Field of Search .................. 414/4, 7, 735, 739; 901/21, 23, 25, 26; 74/469, 665 L, 665 M

[56] References Cited

U.S. PATENT DOCUMENTS

| 2,822,094 | 2/1958 | Greer | 414/8 X |
| 3,111,230 | 11/1963 | Pesenti | 414/7 X |
| 3,253,995 | 5/1966 | Antonsen et al. | 901/26 X |
| 3,315,542 | 4/1967 | Fortin et al. | 901/26 X |

FOREIGN PATENT DOCUMENTS

| 2402829 | 8/1974 | Fed. Rep. of Germany. | |
| 2619336 | 11/1976 | Fed. Rep. of Germany | 901/26 |
| 624788 | 9/1978 | U.S.S.R. | 901/26 |
| 707793 | 1/1980 | U.S.S.R. | |

Primary Examiner—Allan D. Herrmann
Assistant Examiner—Joseph M. Rolnicki
Attorney, Agent, or Firm—Karl F. Ross; Herbert Dubno

[57] ABSTRACT

A manipulator drive has a main support defining a main longitudinal axis, a housing rotatable on the main support about the main longitudinal axis, a head defining a head longitudinal axis and rotatable on the housing about an outer transverse axis crossing the main longitudinal axis, and a holder rotatable on the head about the head longitudinal axis. Respective housing, head, and holder stepdown drive transmissions have outputs connected directly to the housing, head, and holder and inputs and have stepdown transmission ratios of at least 70:1. Respective head and holder drive trains include respective head and holder right-angle drives having input shafts coaxial with the main longitudinal axis and coaxial output shafts defining an inner transverse axis generally parallel to the outer transverse axis but offset along the main longitudinal axis therefrom toward the support, respective head and holder output members connected to the respective transmission inputs and both rotatable about the outer tranverse axis, and respective head and holder connecting elements between the respective output shafts and output members for joint rotation of each output member with the respective output shaft.

11 Claims, 4 Drawing Figures

MANIPULATOR DRIVE

FIELD OF THE INVENTION

The present invention relates to a manipulator drive. More particularly this invention concerns such a drive which gives three degrees of motion to a head of a manipulator arm.

BACKGROUND OF THE INVENTION

A manipulator normally has a main-support arm that is carried on a link and that can be moved about parallel horizontal axes at each end of the link. In addition the link is mounted on a base which can pivot about a vertical axis.

The free end of the main support arm carries a small housing which can be rotated about the longitudinal axis of the arm and which in turn carries a so-called head which can be pivoted on the housing about a transverse axis perpendicular to the main longitudinal axis of the support arm. Finally a small tool or workpiece holder is mounted on the head and is itself rotatable thereon about the longitudinal axis of the head, which can be set by pivoting of the holder about the transverse axis to be parallel to or at an angle to the main support axis. A tool such as a spot welder carried by the tool holder can therefore be set at virtually any angle to a workpiece by such a manipulator.

Such a drive, as described in German patent publication No. 2,619,336, is relatively bulky. Each of the three degrees of motion is powered by a respective electric or hydraulic drive motor connected to the housing through concentric tube shafts. Since the head and holder must be able to pivot about the transverse axis, it is necessary to provide right-angle drives for these parts, to transmit the necessary drive torque through the joint. Normally such drives incorporate at least one shaft parallel to the transverse axis, on the main support, and connected to at least one other shaft at the transverse axis. In fact such a manipulator is normally so bulky that mounting tools on it is difficult. The head is largely recessed in the housing, making the head portion relatively massive and hard to fit into tight locations.

As it is normally desirable to use high-speed low-torque motors for such a drive, it is necessary to provide stepdown transmissions. Typically, as in the above-cited patent document, such transmissions are provided right on the motors. Such an arrangement requires virtually no losses or backlash in the gearing between the transmissions and the controlled elements, as any such losses or play would be synergistically cumulative at the controlled element to make it impossible to position the controlled element exactly.

Another such manipulator drive is known from German patent publication No. 2,402,829. Here the head is largely recessed in the housing and between the relatively narrow head and the side wall of the housing there are two parallel longitudinal intermediate shafts. These shafts are connected via bevel gears to the output for the head and support. In this arrangement also the stepdown transmissions are provided well upstream so that these shafts rotate slowly and rarely through much more than 360°.

Normally most of this mechanism is provided out on the support arm or housing. As a result the moment resulting from this large mass at the end of this relatively long lever is quite great. Thus the manipulator is relatively unwieldy, and requires heavy-duty motors to move itself.

OBJECTS OF THE INVENTION

It is therefore an object of the present invention to provide an improved manipulator drive.

Another object is the provision of such a manipulator drive which overcomes the above-given disadvantages.

A further object is to provide a manipulator drive that is relatively compact.

SUMMARY OF THE INVENTION

These objects are attained according to the instant invention in a manipulator drive having a main support defining a main longitudinal axis, a housing rotatable on the main support about the main longitudinal axis, a head defining a head longitudinal axis and rotatable on the head housing about an outer transverse axis crossing the main longitudinal axis, and a holder rotatable on the head about the head longitudinal axis. Respective housing, head, and holder stepdown drive transmissions have outputs connected directly to the housing, head, and holder and inputs and have stepdown transmission ratios of at least 70:1. Respective head and holder drive trains include respective head and holder right-angle drives having input shafts coaxial with the main longitudinal axis and coaxial output shafts defining an inner transverse axis generally parallel to the outer transverse axis but offset along the main longitudinal axis therefrom toward the support, respective head and holder output members connected to the respective transmission inputs and both rotatable about the outer transverse axis, and respective head and holder connecting elements between the respective output shafts and output members for joint rotation of each output member with the respective output shaft.

Providing the stepdown transmissions according to this invention right at the controlled elements virtually eliminates any play or backlash in the drive trains. With the structure according to the invention it is possible to make the head relatively slim and long, so that the tool holder mounted at the end of it can easily be maneuvered into even relatively cramped quarters.

According to this invention the head is provided with inner and outer shaft assemblies centered respectively on the inner and outer transverse axes. The inner shaft assembly has a pair of coaxial shafts respectively constituting the input shafts of the right-angle drives and the outer shaft assembly has a pair of coaxial shafts respectively constituting the output members of the head and holder drive trains. These inner and outer shaft assemblies are provided with respective roller bearings between the respective shafts.

In order to minimize the size of the housing, it is elongated and has a pair of side plates. The shafts of the assemblies extend through the side plates, and the connecting members are belts lying outside the side plates and spanned over the respective shafts of the assemblies. Both of the transverse axes are on the housing, rather than one on the housing and one on the support as in the prior-art arrangements. Not only does such construction contribute greatly to making the assembly compact, but servicing of these belts—which could easily be replaced by chains—is quite easy.

In accordance with further features of the invention, one of the shafts of each of the shaft assemblies is a long shaft and the other shaft of each of the shaft assemblies is a short shaft. The shaft assemblies each include a bearing between the respective long and short shafts and a double roller bearing supporting the respective long shaft in the respective side plate.

According to this invention, the right-angle drives include bevel gears on the shafts of the inner assembly. The bearing between the shafts of the inner assembly lies between the bevel gears. Since the short shaft of each assembly is supported in a double roller bearing which prevents it from canting, it is possible to use in the respective side wall a simple roller bearing for the long shaft whose inner end is supported by the bearing at the inner end of the short shaft. Obviously this type of construction also reduces the width of the housing substantially.

The manipulator of the instant invention also has respective housing, head, and holder drive motors for the housing, head, and holder. The main support has one end carrying the head and holder and a longitudinally opposite end carrying the motors. In addition the manipulator has respective housing, head, and holder universal shafts connected respectively between the motors and the input of the housing drive transmission, the input shaft of the head right-angle drive, and the input shaft of the holder right-angle drive. Such drive trains are extremely compact. In addition providing the drive motors at the opposite end of the support arm from the head allows them to act as a counterweight for the head and its tool. The drive motors can be carried on a heavy cast motor mount to perfectly balance the entire support arm about its central horizontal pivot axis.

In accordance with another feature of the invention, respective housing, head, and holder control transmissions have inputs connected to the motors and respective outputs, and respective housing, head, and holder switches actuatable by the outputs of the respective control transmissions. These control transmissions are stepdown transmissions with stepdown transmission ratios that are substantially larger than those of the respective drive transmissions. Normally they are larger by at least 27% than the 70:1 to 120:1 ratios of the drive transmissions.

DESCRIPTION OF THE DRAWING

The above and other features and advantages will become more readily apparent from the following, reference being made to the accompanying drawing in which.

SPECIFIC DESCRIPTION

Figure 1:
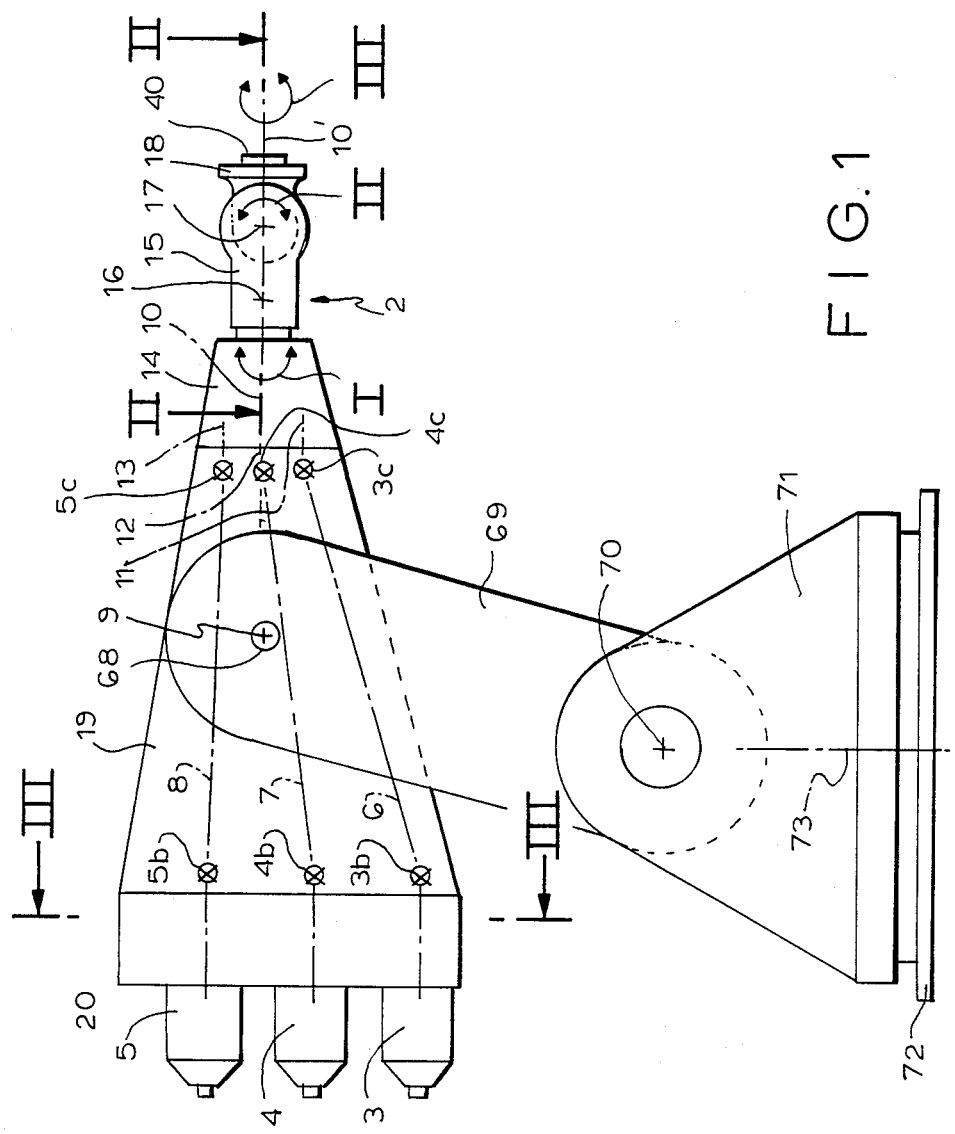
FIG. 1 is a side view of a manipulator according to the present invention.

A manipulator 1 as seen in FIG. 1 basically has a manipulator head 2 carried on a headpiece 14 mounted in turn at one end of a main arm housing 19 rotatable about a horizontal axis 9. On its opposite end this main housing 19 carries a motor mount 20 of spheroidal graphite iron and carrying motors 3, 4, and 5 to act as a counterweight. The housing 19 and headpiece 14 are made of light aluminum-alloy castings.

The motors 3, 4, and 5 have respective output shafts 3a, 4a, and 5a (see FIG. 4) connected via universal joints 3b, 4b, and 5b to respective intermediate drive shafts 6, 7, and 8 connected in turn via further universal joints 3c, 4c, and 5c to input shafts 11, 12, and 13 connected to the head 2. The shaft 7 is slightly offcenter to clear an axle 68 that defines the axis 9. The motors 3, 4, and 5 can be of relatively small horsepower and high speed. Thus the shafts 6, 7, and 8 do not have to transmit considerable torque so that they can relatively lightly dimensioned.

The housing 19 is supported for rotation about the main transverse axis 9 at the outer end of a link 69 pivoted at a horizontal axis 70 parallel to the axis 9 on a base 71 pivotal in turn about a vertical axis 73 perpendicular to the axis 70 on a foundation 72. The freedoms of motion provided by this structure are well known, as are the various drives for effecting such motions.

At its outer end, on the headpiece 14, the main housing 19 carries an intermediate or head housing 15 rotatable as indicated by arrow I relative to this housing 19 about an arm longitudinal axis 10 perpendicular to the axis 9 and perpendicular to inner and outer transverse axes 16 and 17 of the head housing 15 and associated with respective shaft assemblies 47 and 55. The head housing 15 in turn supports a tool head 18 pivotal about the axis 17 perpendicular to the head axis 10 on the head housing 15 as shown by arrow II. In turn this tool head 18 carries a tool support 40 which can rotate on the tool head 18 (FIG. 2) as shown by arrow III about an axis 10' which is the longitudinal axis of the head 18 and perpendicular to the axis 17.

Motion of the intermediate or head housing 15 about the axis 10 as shown by arrow I is powered by the motor 5 via the universal shaft 8 and input shaft 13. This shaft 13 is supported by roller bearings in the headpiece 14 and carries a pinion 58 meshing with a gear 59 on a tube shaft 79 centered on the axis 10. This shaft 79 is the input shaft of a stepdown transmission 60 whose output is constituted by a large-diameter tube shaft 61 supported by roller bearings 74 in the outer end of the headpiece 14 for rotation about the axis 10. The transmission 60 can be of the harmonic-drive or cycloid type. It has a very high stepdown ratio of between 70:1 and 120:1. The tube shaft 61 is part of the head housing 15 which is formed of side plates 49 and 51, cover plates 65 and 66, as well as transverse webs 75.

Motion of the tool head 18 about the axis 17 as shown by arrow II is powered by the motor 3 via the universal shaft 6 and the input shaft 11. This shaft 11 is supported by roller bearings in the headpiece 14 and carries a pinion 62 meshing with a gear 63 carried on a tube shaft 41 coaxial with the axis 10 and tube shaft 79. The opposite end of this shaft 41 in the intermediate or head housing 15 carries a bevel gear 42 meshing with a bevel gear 43 fixed to a shaft 47a of the shaft assembly 47 centered on the transverse axis 16 and supported at one end in a bearing 48 in the side plate 49. The shaft 47a extends through the side plate 49 and carries a pulley 52 connected via a belt 44 to a pulley 76 fixed in turn on a shaft 55a at the axis 17.

Another stepdown transmission 45 having a high stepdown ratio of 70:1 to 120:1 is provided connected between this shaft 55a and an output gear that is part of the tool head 18. The shaft 55a is supported by a bearing 57 in a web 81 of the tool head 18 which itself is supported by bearings 46 on the head housing 15. This head housing 15 is formed at its outer end with a wide slot from which the tool head 18 projects with the possibility of wide angular displacement about the axis 17.

Motion of the tool or workpiece holder 40 about the axis 10' as shown by arrow III is powered by the motor 4 via the universal shaft 7 and input shaft 12. This shaft 12 is supported by roller bearings in the headpiece 14 and is extended along the axis 10 as a shaft 33 that carries a bevel gear 34 meshing with another bevel gear 35 carried on a shaft 47b coaxial with the shaft 47a and axis 16 and forming therewith the shaft assembly 47. A double roller bearing 50 supports the shaft 47b on the side plate 51, and a central bearing 54 is provided between the two shafts 47a and 47b.

The shaft 47b extends through the side plate 51 and carries a pulley 53 connected via a belt 36 to a pulley 77 carried on a shaft 55b coaxial with the shaft 55a and forming therewith the shaft assembly 55. Double roller bearings 64 support the shaft 55b in a web 80 of the housing 15. The end of the shaft 55b opposite the pulley 77 carries a bevel gear 38 meshing with a bevel gear 37 carried on a shaft 67 connected through another stepdown transmission 39 of high ratio to the tool holder 40. An outer casing 78 carried on the housing 15 surrounds the tool holder 40. The adjacent ends of the shafts 55a and 55b are fitted into a bearing 56. Bearings 46 are provided to allow the above-described relative rotation.

Figures 3, 4:
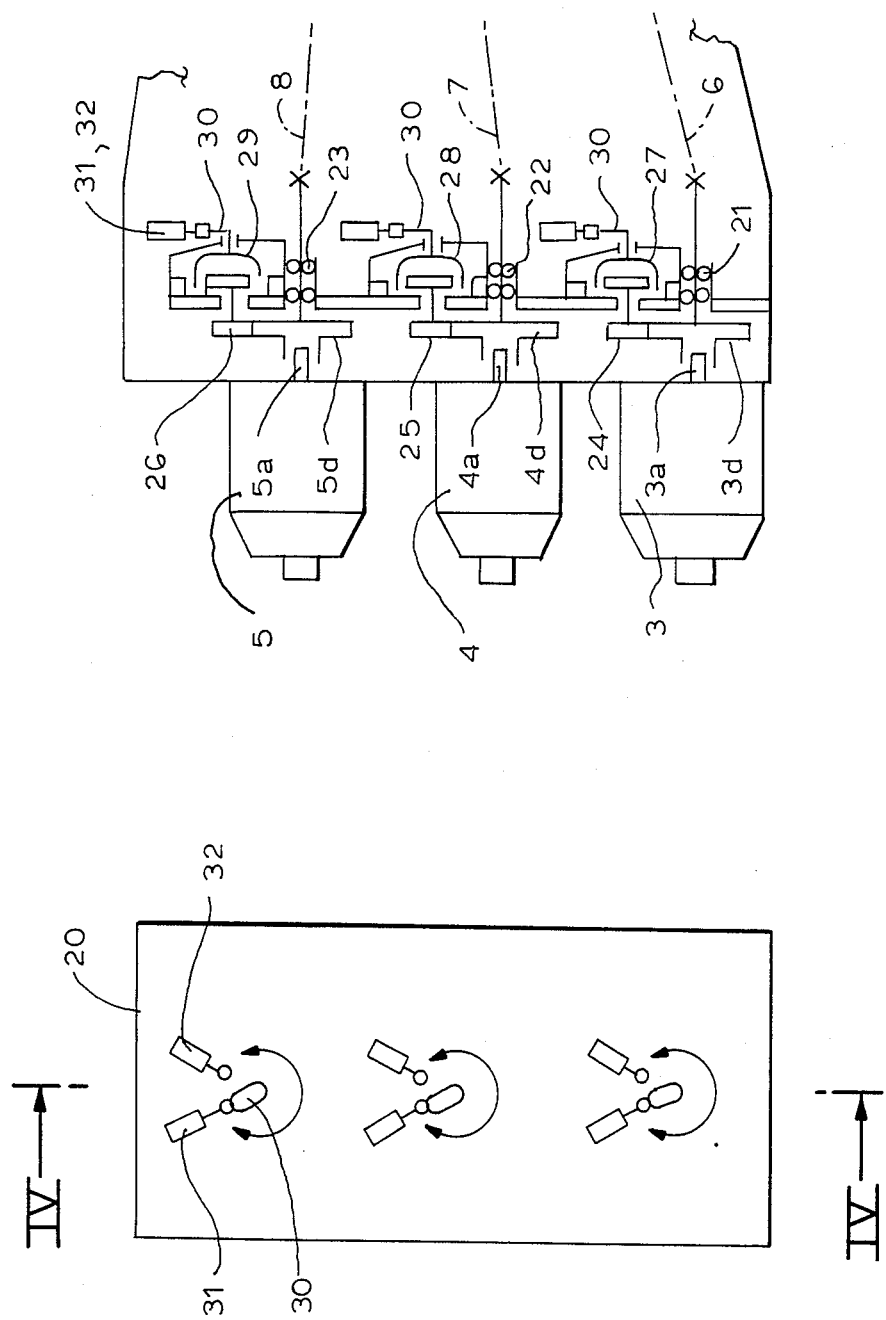
FIG. 4 is a section taken along line iv—iv of FIG. 3.

FIG. 4 shows how the motions of the head housing 15, tool head 18, and tool support 40 are controlled and limited. The input ends of the shafts 6, 7, and 8 of the motors 3, 4, and 5 are supported in the motor mount in double roller bearings 21, 22, and 23, respectively. The output shafts 3a, 4a, and 5a of these motors each carry a respective large-diameter drive gear 3d, 4d, and 5d meshing with a respective small-diameter pinion 24, 25, and 26. The opposite ends of the shafts for these pinions 24, 25, and 26 are connected via respective stepdown transmissions 27, 28, and 29 with actuating arms 30 capable of closing respective end limit switches 31 and 32. The transmissions 27, 28, and 29 have somewhat greater stepdowns than the respective transmissions 60, 45, and 39 so that, for instance, 360° rotation of the housing 15 will only move the respective arm 30 through about 300°. This system prevents the motors 3, 4, and 5 from pivoting the respective controlled elements too far.

Figure 2:
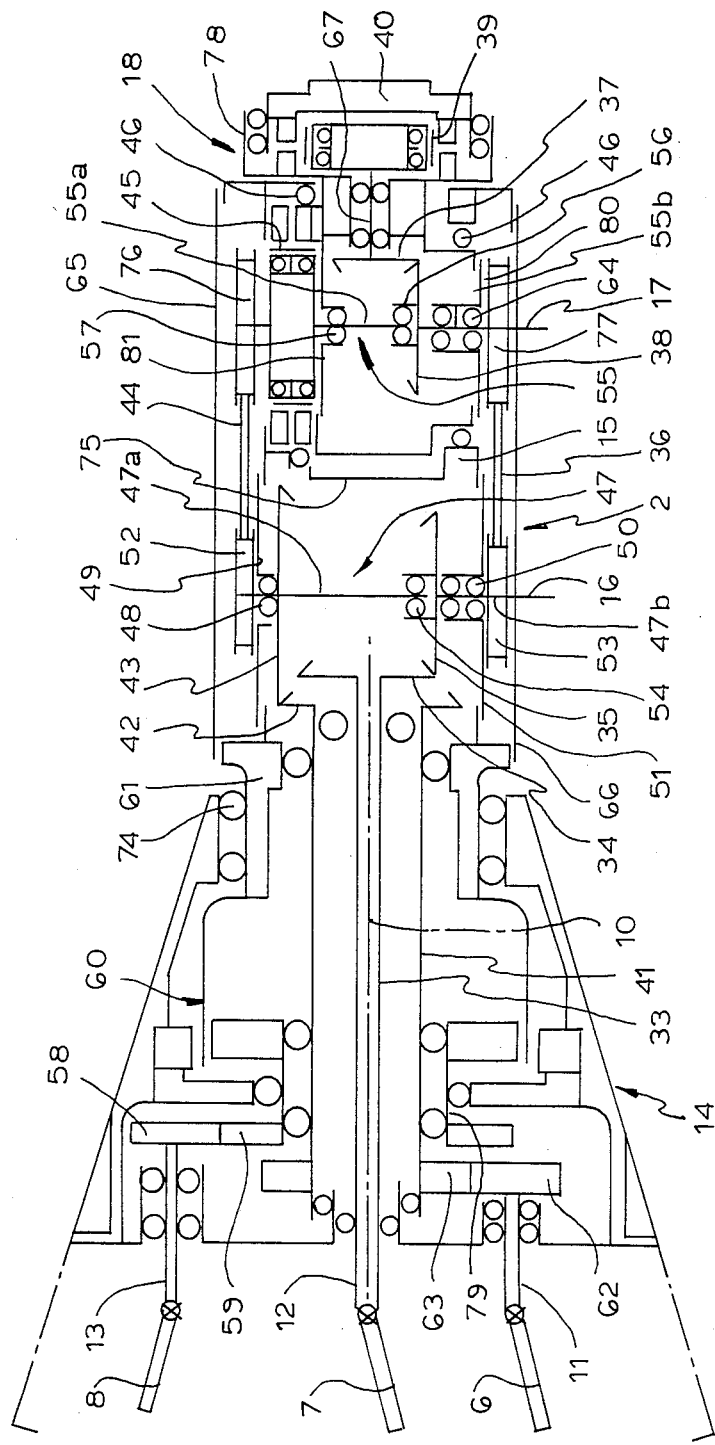
FIGS. 2 and 3 are sections taken respectively along lines ii—ii and iii—iii of FIG. 1.

It would be within the scope of the invention to mount the structure of FIG. 2 inside the arm 19 instead. Furthermore the structure of FIG. 2 could be mounted in a manipulator or other machine element different from that of FIG. 1.

The drive system according to the instant invention is quite compact. Since the speed reduction takes place immediately upstream in each drive train from the controlled element, the system will operate virtually without play and backlash. Furthermore the particular construction produces a head and housing which are relatively long and slim rather than short and fat, so that a tool carried in the tool holder can get into relatively tight locations. The counterweighted main support arm can be pivoted about its central axis 9 relatively easily, even when it is carrying a tool. Having motors 3, 4, and 5 at one end of the arm 19 further eases servicing, as compared to a system wherein the motors are mounted outward of the pivot axis of the main support arm.

I claim:
1. A manipulator drive comprising:
a main support defining a main longitudinal axis;
a housing rotatable on said main support about said main longitudinal axis;
a head defining a head longitudinal axis and rotatable on said housing about an outer transverse axis crossing said main longitudinal axis;
a holder rotatable on said head about said head longitudinal axis;
respective housing, head, and holder stepdown drive transmissions carried respectively in the support, housing, and head and having
respective housing, head, and holder outputs connected directly to said housing, head, and holder and
respective housing, head, and holder inputs, said transmissions having stepdown transmission ratios from their respective inputs to their respective outputs of at least 70:1; and
respective head and holder drive trains including
respective head and holder right-angle drives having input shafts coaxial with said main longitudinal axis and coaxial output shafts defining an inner transverse axis generally parallel to said outer transverse axis but offset along said main longitudinal axis therefrom toward said support,
respective head and holder output members connected to the respective transmission inputs and both rotatable about said outer transverse axis, and
respective head and holder connecting elements between the respective output shafts and output members for joint rotation of each output member with the respective output shaft.

2. The manipulator drive defined in claim 1 wherein said housing is provided with inner and outer shaft assemblies centered respectively on said inner and outer transverse axes, said inner shaft assembly having a pair of coaxial shafts respectively constituting said input shafts of said right-angle drives and said outer shaft assembly having a pair of coaxial shafts respectively constituting said output members of said head and holder drive trains.

3. The manipulator defined in claim 2 wherein said inner and outer shaft assemblies are provided with respective roller bearings between the respective shafts.

4. The manipulator drive defined in claim 2 wherein said housing is elongated and has a pair of side plates, said shafts of said assemblies extending through said side plates, said connecting members being belts lying outside said side plates and being spanned over the respective shafts of said assemblies.

5. The manipulator drive defined in claim 4 wherein one of the shafts of each of said shaft assemblies is a long shaft and the other shaft of each of said shaft assemblies is a short shaft, said shaft assemblies each including a bearing between the respective long and short shafts and a double roller bearing supporting the respective short shaft in the respective side plate.

6. The manipulator drive defined in claim 5 wherein said right-angle drives include bevel gears on said shafts of said inner shaft assembly, said bearing between said shafts of said inner shaft assembly lying between said bevel gears.

7. The manipulator drive defined in claim 2, further comprising
respective housing, head, and holder drive motors for said housing, head, and holder, said main support having one end carrying said head and holder and a longitudinally opposite end carrying said motors, and
respective housing, head, and holder universal shafts connected respectively between said motors and said input of said housing drive transmission, said input shaft of said head right-angle drive, and said input shaft of said holder right-angle drive.

8. The manipulator drive defined in claim 7, further comprising respective housing, head, and holder control transmissions having inputs connected to said motors and respective outputs, and respective housing, head, and holder switches actuatable by said outputs of the respective control transmissions.

9. The manipulator drive defined in claim 8 wherein said control transmissions are stepdown transmissions with stepdown transmission ratios that are substantially larger than those of the respective drive transmissions.

10. The manipulator drive defined in claim 1 wherein said support is formed as a light-metal casting.

11. A manipulator drive comprising:
a main support defining a main longitudinal axis;
a housing rotatable on said main support about said main longitudinal axis;
a head defining a head longitudinal axis and rotatable on said housing about an outer transverse axis crossing said main longitudinal axis;
a holder rotatable on said head about said head longitudinal axis;
respective housing, head, and holder drive transmissions having
 respective housing, head, and holder outputs connected to said housing, head, and holder and
 respective housing, head, and holder inputs; and respective head and holder drive trains including
 respective head and holder right-angle drives having input shafts coaxial with said main longitudinal axis and coaxial output shafts defining an inner transverse axis generally parallel to said outer transverse axis but offset along said main longitudinal axis therefrom toward said support,
 respective head and holder output members connected to the respective transmission inputs and both rotatable about said outer transverse axis, and
 respective head and holder connecting elements between the respective output shafts and output members for joint rotation of each output member with the respective output shaft.

* * * * *